Jan. 3, 1950     C. S. EVANS     2,493,283
FERRULE FOR WELDING
Filed July 6, 1945
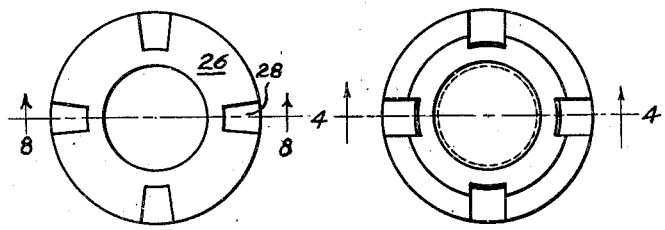
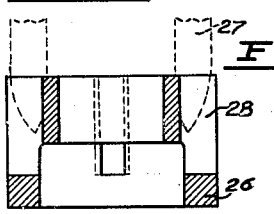
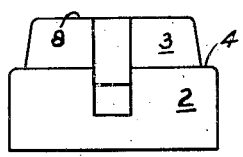
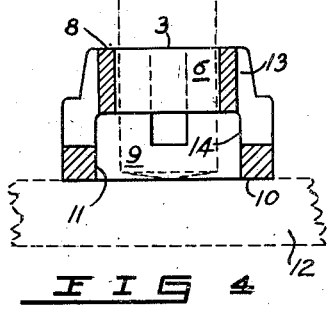
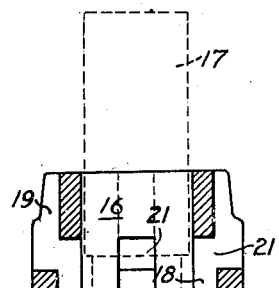
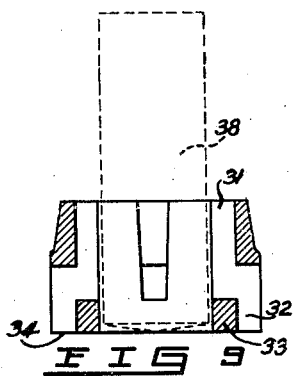
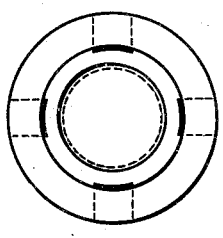
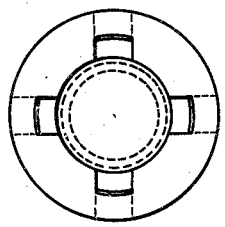
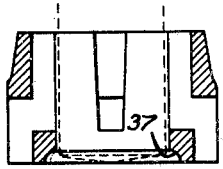
INVENTOR
Charles S. Evans Patented Jan. 3, 1950

2,493,283

UNITED STATES PATENT OFFICE 2,493,283

FERRULE FOR WELDING

Charles S. Evans, Atherton, Calif., assignor, by mesne assignments, to Morton Gregory Corporation, a corporation of Michigan Application July 6, 1945, Serial No. 603,513

6 Claims. (Cl. 219—8)

My invention relates to a ferrule or sleeve for enclosing the end of a stud when welding the stud to another body.

In recent years very important developments have taken place in the art of arc welding studs. The development of machines with which studs of various sizes may be rapidly and perfectly welded to a supporting structure has revolutionized construction methods for many different articles because of lessened cost with better results.

In nearly all applications of the welded stud to mechanical construction, results are greatly improved, and needed controls established, if the arcing occurs in a small vented chamber. This is supplied by surrounding the welding end of the stud with a sleeve or ferrule made of material such as porcelain which will withstand the terrific heat of the welding arc for at least one exposure. The interior diameter of the bore of the ferrule immediately surrounding the arc is somewhat larger than the stud, and this annular chamber between stud and ferrule is connected to the open air by means of vents which are spaced circumferentially about the ferrule.

It is literally true that the ferrule has a confining function both as to the fluid and gaseous products which come into being with explosive violence with the arc. It is also true that while the ferrule confines, the vents release the gases, maintaining a certain pressure within the chamber, but preventing too much. With a ⅜" stud, about ⅛" is consumed in the weld, so that there are substantial quantities of molten metal and hot gases produced in a fraction of a second and in a very small space. Without confinement the metal is spattered in all directions and the desired welded union either does not occur or the union is partial and imperfect.

Long experimenting has not yet made it possible to evaluate critically all the factors in this problem, but it has been established that by surrounding the end of the stud at the instant of welding with a vented chamber of suitable proportions and design, a control of arc, heat, molten material, gases, pressure and rate of cooling is established and that these may be brought into balance to produce perfect welds rapidly and in indefinite succession.

The position of the vents in the annular chamber surrounding the stud is important no less than their size and number. Since the ferrules are usually partially destroyed by the welding arc, one is used for each weld. Obviously then the ferrules must be such as to be readily made in large quantities at low unit cost. For this reason, vents have been formed heretofore as notches in the end edge of the ferrule so that the molding means and process by which the ferrules are customarily made are not complicated. However, the venting of the chamber is not always best accomplished by locating the vents on the edge of the ferrule. Further, the vents interrupt the smooth wall surface immediately adjacent the weld, and to that extent make an irregular fillet where an even fillet is desired, or prevent the fullest use of the ferrule in molding the molten material of the joint at the moment of forming.

It is one of the objects of my invention to provide a ferrule in which the vents pass through the wall of the ferrule at a desired point spaced from the edge, so that a continuous wall surrounds the site of the weld.

Another object is the provision of a ferrule having predetermined lines of weakness so that fragmentation of a ferrule which remains on the stud after welding is facilitated.

My invention possesses other objects and features of value, some of which with the foregoing will be set forth in the following description of the invention. It is to be understood that I do not limit myself to the showing made by the said description and the drawings as I may adopt variant forms of the invention within the scope of the appended claims.

Referring to the drawings, Figure 1 is an elevation of a ferrule embodying my invention; and Figures 2 and 3 are top and bottom views respectively. Figure 4 is a vertical section, the plane of section being indicated by the line 4—4 of Figure 2. Figure 5 is a similar section through a ferrule of modified internal shape; and Figure 6 is a bottom view of this ferrule. Figure 7 is a top view of an embodiment of my invention; and Figure 8 is a vertical sectional view taken in a plane indicated by the line 8—8 of Figure 7. Figures 9 and 10 are vertical half sectional views of other modified forms of my invention.

All of the figures are drawn to an enlarged scale, the ferrules being intended for use with a ⅜" stud.

Two main requirements attend the selection of a material out of which the ferrules of my invention are made. The material must withstand for the instant required the intense heat in the immediate vicinity of the electric welding arc, at least for one exposure; and it must be cheap, and easily made into the required shape. While various refractory materials have been tried, porcelain or semi-porcelain ferrules made from clay have proved the best. It is abundant and cheap, easily worked and stands up well under the arc heat long enough to perform its function.

The ferrule or sleeve of my invention comprises an annular sleeve or shell, having a body 2 from which a slightly tapered neck 3 extends, leaving a shoulder 4 at the juncture of body and neck. This neck and shoulder are complementary to and provide a convenient means for attachment to the ferrule chuck which is the usual device utilized to hold the ferrule in position about the stud during the welding, as shown in connection with a spring chuck in the patent to Nelson Re. 22,411; or in connection with a jaw chuck as shown in my prior Patent No. 2,416,915.

The inside of the ferrule is shaped by two bores. One, 6, a trifle larger than the stud 7 (shown in short dash lines), extends through the neck from the upper edge 8 and for a short distance into the body where it opens into the larger and concentric bore 9, which extends to the lower rim 10 of the ferrule. This larger bore therefore provides a chamber surrounding the site of the weld, and in which the annular boundary wall 11, next adjacent the lower rim, is continuous; it being remembered that the ferrule is positioned against the plate or wall 12 (shown in short dash lines) to which the stud is welded, with the lower rim 10 flat thereagainst.

Vents through the body wall above the continuous rim are provided. Spaced at 90° intervals around the outside of the ferrule, and extending from the top across the neck and well along the body are recesses or grooves 13. These grooves extend into the wall of the neck for about one-half its thickness, but on account of the larger bore in the body of the ferrule, the grooves break through into that chamber, thus forming vent openings 14, spaced around the upper part of the chamber. This leaves the lower annular wall continuous, and better adapted to act as a mold to the extent it is desired to shape the stud end and fillet.

Figures 5 and 6 show a modified form of my ferrule, suitable for use with an undercut stud, when it is desired to restrict the formation of a fillet at the juncture of stud and plate. In this case the bore 16 of the ferrule is substantially uniform throughout, being only a small amount larger than the diameter of the stud 17 with which it is used. It may be slightly tapered to provide "draft" if required in the molding procedure. Spaced around the lower half of the bore are recesses or grooves 18 aligned with and breaking through into the outside recesses or grooves 19, so that vents 21 are formed at the juncture of each pair of aligned internal and external recesses. Small beads of metal tend to run from the weld into the lower ends of the grooves 18, but these are readily removed when it is necessary to have a smooth square corner at the juncture of stud and plate.

A further usefulness of the grooves, and an important one in some applications of stud welding lies in their cooperative relation with the oppositely disposed spring jaws of a holding chuck like that shown in my prior Patent No. 2,416,915. Under some conditions, space around a stud is very limited and means for holding the ferrule in position must be restricted to minimum dimensions. Where grooves are to receive the jaws of the holding chuck, it is preferable to taper them somewhat as shown in Figures 7 and 8. It will be noted that in such a case the body or wall 26 of the ferrule is substantially uniform in thickness since no neck is included. The jaws 27 of a holding chuck are shown in dotted lines to indicate the cooperation of grooves 28 with such holding means.

In Figures 9 and 10, I have shown another modification of my ferrule having special usefulness where a continuous wall without interruption of any kind, is wanted close to the weld site or where it is desired to definitely mold a complete or fragmentary fillet at the base of the stud. Broadly the grooves are in reverse of those shown in Figure 5; upper grooves 31 on the inside opening into lower grooves 32 on the outside, so as to leave the inner face 33, below the vents 34 and adjacent the lower rim 36, without a break or interruption. In Figure 10 is shown a ferrule which differs from that of Figure 9 only in the shaping of the inner lower edge to provide a surface 37 for molding a fillet around the base of the stud. In both Figures 9 and 10 a stud 38 is indicated by dotted lines in position in the ferrule ready for the weld to be made. It will be understood of course that this stud may be either the one shown, or an undercut stud as shown in Figure 5.

It will be observed that in each of the ferrules described, the bottom surfaces of each pair of the aligned internal and external recesses must when prolonged meet or slightly overlap in order to form a vent through the wall. It will also be obvious that by keeping the side surfaces of the recesses in parallelism with the central axis of the sleeve, or at such slight angle as required for "draft," the sleeve may be molded with the simplest of patterns, drawing axially from the mold without the necessity for cores. This of course lends itself to rapid machine molding.

Except in certain cases, it is necessary to clear the stud of the ferrule after the weld has been made. Sometimes the ferrule is partially consumed or so broken during the welding that the pieces fall away from the stud when the welding gun is withdrawn from it. When a ferrule or portion of it hangs on the stud, it is customarily broken and freed by a single hammer blow. The grooves have the additional function of facilitating the breaking of the ferrule into such pieces as have no tendency to cling to the stud; and in that regard they create zones or lines of weakness.

I claim:

1. A ferrule for enclosing the end of a stud when welding the stud to a plate, comprising a sleeve having internal and external recesses extending axially of the sleeve from opposite ends thereof and past a common plane perpendicular to the sleeve axis to join in a vent through the wall of the sleeve.

2. A ferrule for enclosing the end of a stud when welding the stud to a plate, comprising a sleeve having a bore larger at one end than at the other, and having external grooves in the wall of the sleeve opposite the small end of the bore, said grooves being of depth sufficient to enter the larger end of the bore to form vents through the wall of the sleeve.

3. A ferrule for enclosing the end of a stud when welding the stud to a plate, comprising a sleeve having a substantially uniform bore therethrough, the wall of the sleeve having a plurality of pairs of aligned recesses, the recesses of each pair extending toward each other axially from opposite ends of the sleeve and on opposite sides of the sleeve wall to join in a vent through the wall.

4. A ferrule for enclosing the end of a stud when welding the stud to a plate, comprising a sleeve having internal and external recesses extending toward each other axially from opposite ends of the sleeve to join in a vent through the wall of the sleeve the internal surface of the sleeve adjacent the welding end of the stud forming a continuous molding surface.

5. A ferrule for enclosing the end of a stud when welding the stud to a plate, comprising a sleeve having a bore larger at one end than at the other, and having a plurality of axially extending external grooves in the sleeve wall and intercepting the larger part of the bore to form vents through the wall between the ends of the sleeve.

6. A ferrule for enclosing the end of a stud when welding the stud to a plate, comprising a sleeve having a plurality of pairs of aligned internal and external recesses extending lengthwise of the sleeve in the wall thereof and meeting to form vents therethrough, the external recesses being in that end of the sleeve surrounding the welding end of the stud.

CHARLES S. EVANS.

REFERENCES CITED

The following references are of record in the file of this patent:

UNITED STATES PATENTS

| Number | Name | Date |
| --- | --- | --- |
| 2,315,502 | Crecca et al. | Apr. 6, 1943 |
| 2,402,256 | Nelson | June 18, 1946 |